US012612196B2

(12) United States Patent
Barrett et al.

(10) Patent No.: US 12,612,196 B2
(45) Date of Patent: Apr. 28, 2026

(54) AERIAL VEHICLES WITH PROTECTIVE MEMBERS FOR ABSORBING SHOCK LOAD DURING WIRE STRIKE

(71) Applicant: University of Kansas, Lawrence, KS (US)

(72) Inventors: Ronald M. Barrett, Lawrence, KS (US); Mason Ross Denneler, Lawrence, KS (US); Zachary Schwab, Louisville, KY (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 18/681,408

(22) PCT Filed: Aug. 5, 2022

(86) PCT No.: PCT/US2022/039624
§ 371 (c)(1),
(2) Date: Feb. 5, 2024

(87) PCT Pub. No.: WO2023/015001
PCT Pub. Date: Feb. 9, 2023

(65) Prior Publication Data
US 2024/0327045 A1 Oct. 3, 2024

Related U.S. Application Data

(60) Provisional application No. 63/230,009, filed on Aug. 5, 2021.

(51) Int. Cl.
B64U 30/299 (2023.01)
B64U 20/30 (2023.01)
B64U 60/50 (2023.01)

(52) U.S. Cl.
CPC ........... B64U 30/299 (2023.01); B64U 20/30 (2023.01); B64U 60/50 (2023.01)

(58) Field of Classification Search
CPC ... B64C 29/0025; B64C 29/02; B64C 27/006; B64U 30/299; B64U 20/30; B64U 10/20; B64D 45/06
See application file for complete search history.

(56) References Cited

U.S. PATENT DOCUMENTS

| | | | |
|---|---|---|---|
| 9,550,561 B1 | 1/2017 | Beckman et al. | |
| 9,601,040 B2 * | 3/2017 | Barrett .................... | G09F 21/08 |
| 2007/0138340 A1 | 6/2007 | Arafat et al. | |

(Continued)

OTHER PUBLICATIONS

International Search Report and Written Opinion from PCT/US2022/039624 mailed Jan. 10, 2023.

*Primary Examiner* — Arfan Y. Sinaki
(74) *Attorney, Agent, or Firm* — Ray Quinney & Nebeker P.C.; Paul N. Taylor

(57) ABSTRACT

This disclosure generally relates to aerial vehicles that may convert from hover-mode to missile-mode flight and back via body tilt for efficient flight and can strike wires such that neither the wires nor the aircraft are damaged, and divergence is prevented. This includes an aerial vehicle having an elongate fuselage having a nose tip, a plurality of engines connected to the fuselage, and at least three protective members connected substantially near the nose tip of the fuselage longitudinally beyond the plurality of engines.

20 Claims, 10 Drawing Sheets

(56) References Cited

U.S. PATENT DOCUMENTS

| | | | |
|---|---|---|---|
| 2018/0154270 A1 | 6/2018 | Barrett et al. | |
| 2020/0023829 A1 | 1/2020 | Hefner et al. | |
| 2020/0086985 A1* | 3/2020 | LeGrand | B64C 29/02 |
| 2022/0087377 A1 | 3/2022 | Garcia | |

* cited by examiner

300

308

306

302

304

308

306

308

800

Determine center of gravity for the aerial vehicle without a payload — 872

Connecting a payload to the aerial vehicle — 874

Moving the payload inside the aerial vehicle to match the center of gravity of the payload with the center of gravity of the aerial vehicle — 876

900

Detecting a first pitching moment along a protective member — 978

Detecting a second pitching moment along the protective member, wherein the first pitching moment and the second pitching moments are generated about a center of gravity of the aerial vehicle — 980

Minimizing an offset distance by providing an arch shaped protective member — 982

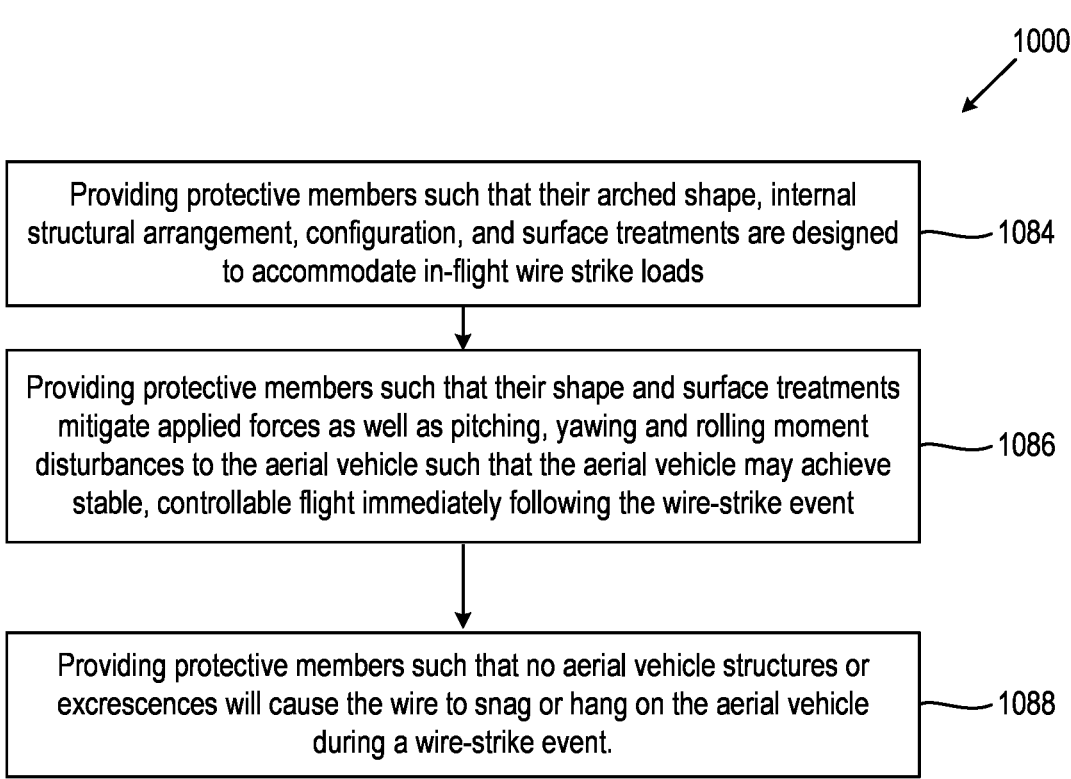

1000

Providing protective members such that their arched shape, internal structural arrangement, configuration, and surface treatments are designed to accommodate in-flight wire strike loads — 1084

Providing protective members such that their shape and surface treatments mitigate applied forces as well as pitching, yawing and rolling moment disturbances to the aerial vehicle such that the aerial vehicle may achieve stable, controllable flight immediately following the wire-strike event — 1086

Providing protective members such that no aerial vehicle structures or excrescences will cause the wire to snag or hang on the aerial vehicle during a wire-strike event. — 1088

FIG. 10

AERIAL VEHICLES WITH PROTECTIVE MEMBERS FOR ABSORBING SHOCK LOAD DURING WIRE STRIKE

CROSS-REFERENCE TO RELATED APPLICATIONS

This application claims priority to and the benefit of U.S. Provisional Patent Application No. 63/230,009, filed on Aug. 5, 2021, which is hereby incorporated by reference in its entirety.

BACKGROUND

The creation of unmanned aerial vehicles (UAV) began shortly after the advent of the first manned airplanes. Uninhabited vehicles have the distinct advantage of not endangering a pilot, crew members, and passengers so the demand for research into these designs ballooned during the first world war. Elmer Sperry, an inventor who specialized in gyroscopes, together with Peter Hewitt, created the Hewitt-Sperry Automatic Airplane, one of the first pilotless aircraft. This design and its later successors functioned more like a rudimentary cruise missile but did demonstrate that unmanned aircraft could still nonetheless be controlled without an onboard presence of a human pilot. For many years, UAVs remained a tool used primarily for war. However, as designs and control methods improved, so did the capabilities of drones. By the turn of the century 21st century drones had entered the public consciousness and what followed was a rapid growth of new applications for the civilian market.

In the past twenty years UAVs have been used for a wide variety of programs; from remote sensing of crops to border patrol and local law enforcement. A large hobby market also developed in the past decade where mass produced self-controlled toy drones became commonplace. Recently more corporations are exploring the option of employing UAVs as delivery systems as they can provide better flexibility and convenience over conventional methods. Similar considerations also apply to medical supplies delivery. Often deliveries must be made either at a rapid pace and/or to an area affected by a largescale disaster, which are both obstacles that can be difficult for ground vehicles to manage. While manned aircraft such as helicopters can provide this, they are expensive and require highly trained pilots to operate. Unmanned delivery drones can solve both problems and have greater accessibility, which leads to more saved lives.

BRIEF SUMMARY

In some embodiments, an aerial vehicle comprises: a fuselage having a nose tip and being elongate, a plurality of engines connected to the fuselage, and at least three protective members connected substantially near the nose tip of the fuselage longitudinally beyond the plurality of engines.

In other embodiments, a method for balancing an aerial vehicle is provided, comprising: determining center of gravity for the aerial vehicle without a payload, connecting a payload to the aerial vehicle, and moving the payload, having a payload center of gravity, inside the aerial vehicle to match the center of gravity of the payload with the center of gravity of the aerial vehicle.

In yet other embodiments, an aircraft structure is provided such that during a wire-strike event of the UAV, the effects of the generated moments and forces from said event are reduced to the point that catastrophic flight state disturbances or a crash are avoided. Such wire-strike mitigation structures may take the form of an arch which would allow for harmless passage of the wire above or below the aircraft without snagging or physically breaking the aircraft structures and allowing stable, controllable flight after the wire-strike event.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 5-1 represents a top-down figure of an aerial vehicle having four ring wings, according to at least one embodiment.

FIG. 5-2 represents a top-down figure of an aerial vehicle having three ring wings, according to at least one embodiment.

FIG. 5-3 represents a top-down figure of an aerial vehicle having five ring wings, according to at least one embodiment.

FIG. 10 is a flow chart illustrating a method for mitigating pitching, yawing, and rolling moments for an aerial vehicle during wire strike.

DETAILED DESCRIPTION

Figure 1:
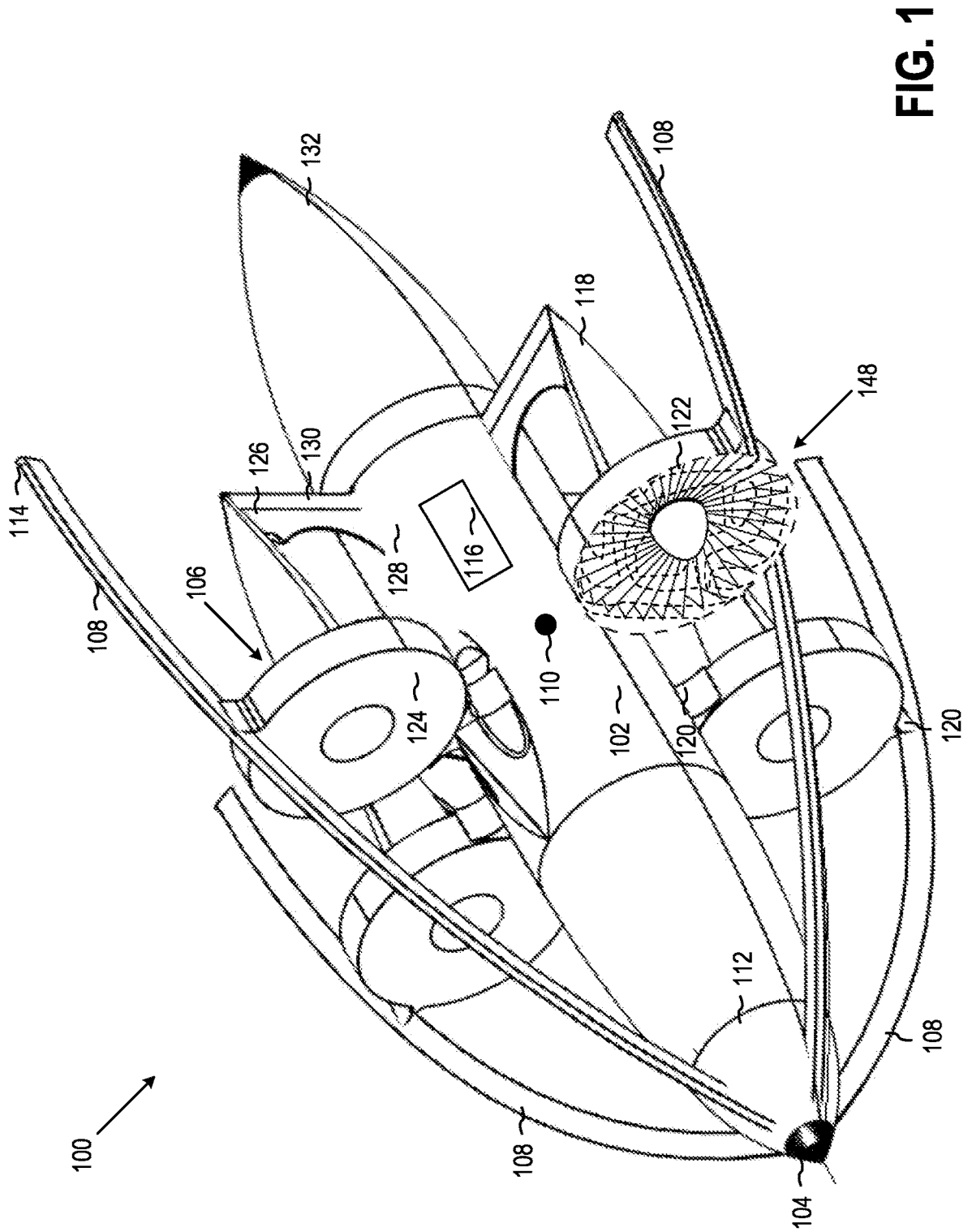
FIG. 1 represents an aerial vehicle in flight mode, according to at least one embodiment.

Vertical takeoff and landing aerial vehicles can be generally categorized into one of two types. The first of these is a traditional helicopter-like design. Popular in package delivery, these concepts typically feature four or more rotors that generally spin within a primarily horizontal plane and so as to lift the aircraft with the smallest amount of power given geometric constraints. However, this design suffers from low horizontal travel speeds and a well-documented pitch-back instability which tends to inherently pitch the aircraft backwards with increasing airspeed. This can be improved by using a compound helicopter design, which adds a pusher prop to increase top speeds, partially mitigating pitchback instabilities. The main benefit of these designs beyond vertical efficiency is that they maintain the ability to hover in place for extended periods of time, resisting gust disturbances which is helpful for difficult takeoff or landing environments.

The second general category of UAVs features a variety of transitioning aircraft, which take off vertically but transition to horizontal flight for cruise like an airplane or missile. One common transitioning, or "convertible" aircraft is a tilt-rotor aircraft like the famous V-22 Osprey. The V-22 type "tilt-rotor" aircraft takes off and lands the same as a helicopter design, but transitions to an airplane type flight mode for horizontal travel. This trades some vertical efficiency for horizontal speed and range. An aircraft configuration which sheds much of the mechanical complexity of the tilt-rotor configuration, while maintaining its efficiency tilts its entire body as it converts from helicopter-mode flight to missile-mode flight. This body-tilt design allows the entire structure of aircraft to pitch between helicopter-mode flight and missile-mode flight. For many applications, this concept makes the most sense for vertical takeoff and landing aircraft that must also travel long distances at high speeds.

One issue with nearly every design of aerial vehicle is the possibility of human contact with spinning rotors, which is a real danger with fully autonomous systems. Another purpose is that the desired design of aerial vehicle must travel long distances at high speeds while remaining controllable and safe to civilians. At least one embodiment of an aerial vehicle described herein satisfies one or more of these requirements better than any of the other existing designs.

This disclosure generally relates to aerial vehicles that can strike wires such that neither the wires nor the aircraft are damaged, and aircraft aeromechanical divergence and therefore a crash is prevented. Aerial vehicles operating below 500 feet have and will continue to strike wires at an alarming rate, no matter how good their wire detection or avoidance systems are. The FAA reported that roughly 5% of all VTOL aircraft strikes from 1963 to present are attributed to wire strikes. In a 10-year period, the NTSB recorded 208 civil helicopter wire strike accidents. In these accidents, 37 people lost their lives, 52 people suffered serious injury, 88 aircraft (42%) were destroyed, and 120 aircraft (58%) were damaged substantially. Because of the great danger to aircraft of many types, especially helicopters, there is a need for a configuration of this type given low flight levels.

Currently a popular wire-strike mitigation technique used on full-scale aircraft is a cable cutter. Such a device would actively cut through a wire in the event of a strike. Given the smaller size of many families of UAVs, use of a cable cutter is simply not an option as there is not enough kinetic energy available from UAV flight to allow the cable to be cut. Further, such cable cutting is dangerous to bystanders, especially when live power lines are cut and they are expensive to fix; accordingly, cable splitting, protective arch elements, 108 are preferred to maintain safe flight without endangering people or property in the event of a wire strike.

There is also a need for VTOL aircraft to go fast below 500 ft which is the "shelf" above which controlled airspace begins in many places. To go fast and do so efficiently, full aircraft conversion from helicopter-mode flight to airplane or missile-mode flight is a must. Given that broken wires and/or destroyed aircraft induce injuries and fatalities, there is a need for a type of aircraft that can go fast at low levels and do so safely without risking damage to the aircraft or wires. At least one embodiment of an aerial vehicle described herein can safely strike a wire with neither wire break nor crash of the aerial vehicle.

Referring now to the figures, FIG. 1 is a representation of an aerial vehicle 100 in flight mode (e.g., a generally horizontal flight mode), according to at least one embodiment. The aerial vehicle 100 includes an elongate fuselage 102 having a nose tip 104, plurality of engines 106 connected to the fuselage 102 and at least three protective members 108 connected substantially near the nose tip 104 of the fuselage 102 longitudinally beyond the plurality of engines 106.

In some embodiments, the nose tip 104 may be a sharp apex preceding the protective members 108 and the fuselage 102. The advantage of having a sharp apex nose tip 104 is that if the aerial vehicle 100 strikes a wire the wire must be definitively pushed over or under the aerial vehicle 100. Without a sharp apex, the wire might be caught on the nose of the aerial vehicle which would most likely induce flight divergence (e.g., irrecoverable flight mode). Flight divergence may occur when the flight characteristics of the aerial vehicle have changed to the point where stable flight can no longer be maintained. Such aeromechanical divergence can induce an aircraft tumble or uncontrollable flight path deviation into the ground or surrounding buildings, or crashing, thereby threatening to injure or kill bystanders. In another example, if a wire strikes a blunt-nosed aerial vehicle, the aerial vehicle may pitch in such a way that the aerial vehicle is put into a spin (e.g., about a center of gravity) such that the aerial vehicle is no longer capable of controlled flight. Similarly, current UAV designs may snag a wire on a point that is further aft from the nose, blunt or not. Such a snag would similarly induce flight path deviations and potentially a crash, or could even hang the aircraft in mid-air.

Figure 2:
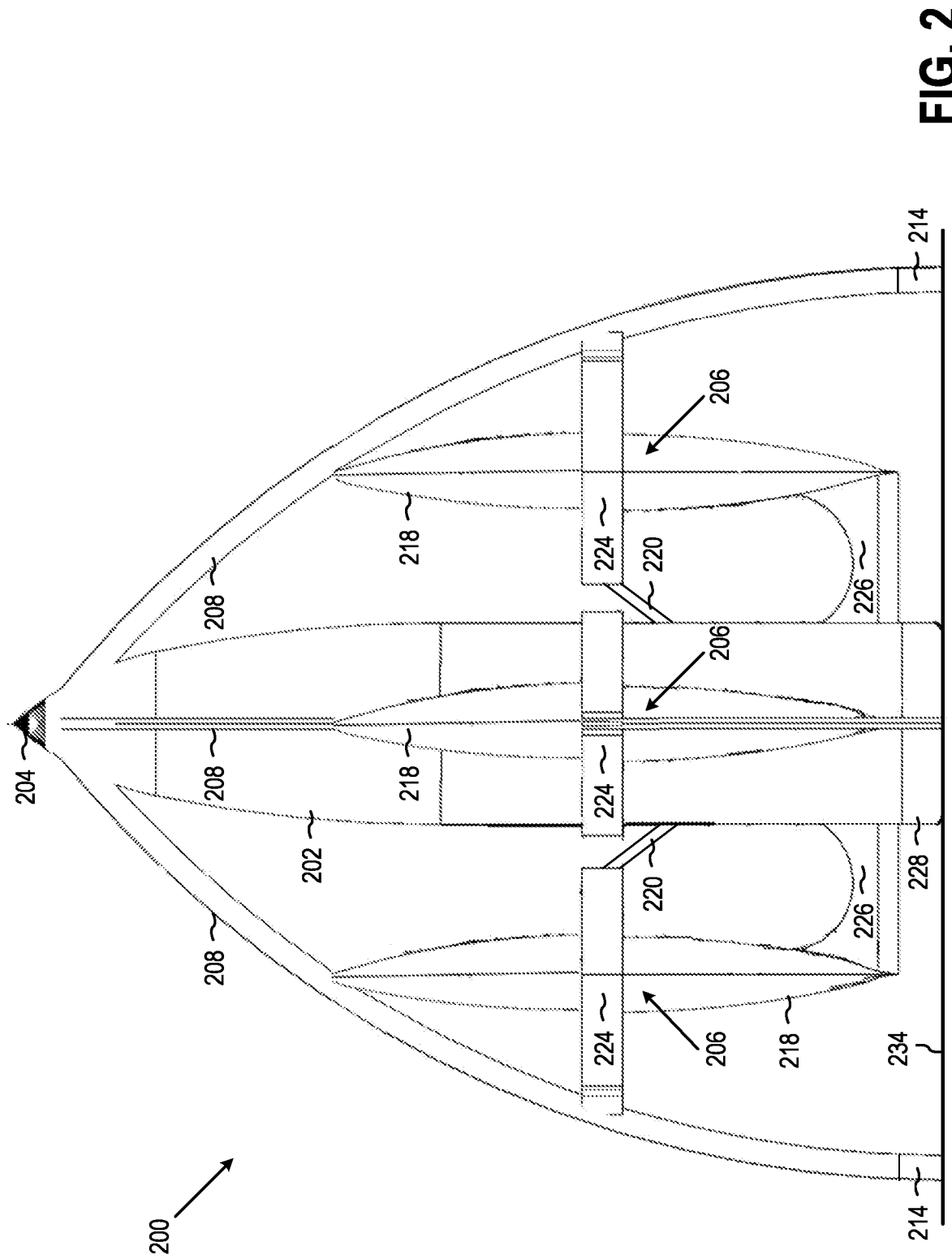
FIG. 2 represents an aerial vehicle in landed mode, according to at least one embodiment.
Figure 3:
FIG. 3 represents an aerial vehicle in flight mode having second alternative type of nose tip, according to at least one embodiment.
Figures 1, 2, 3, 5:
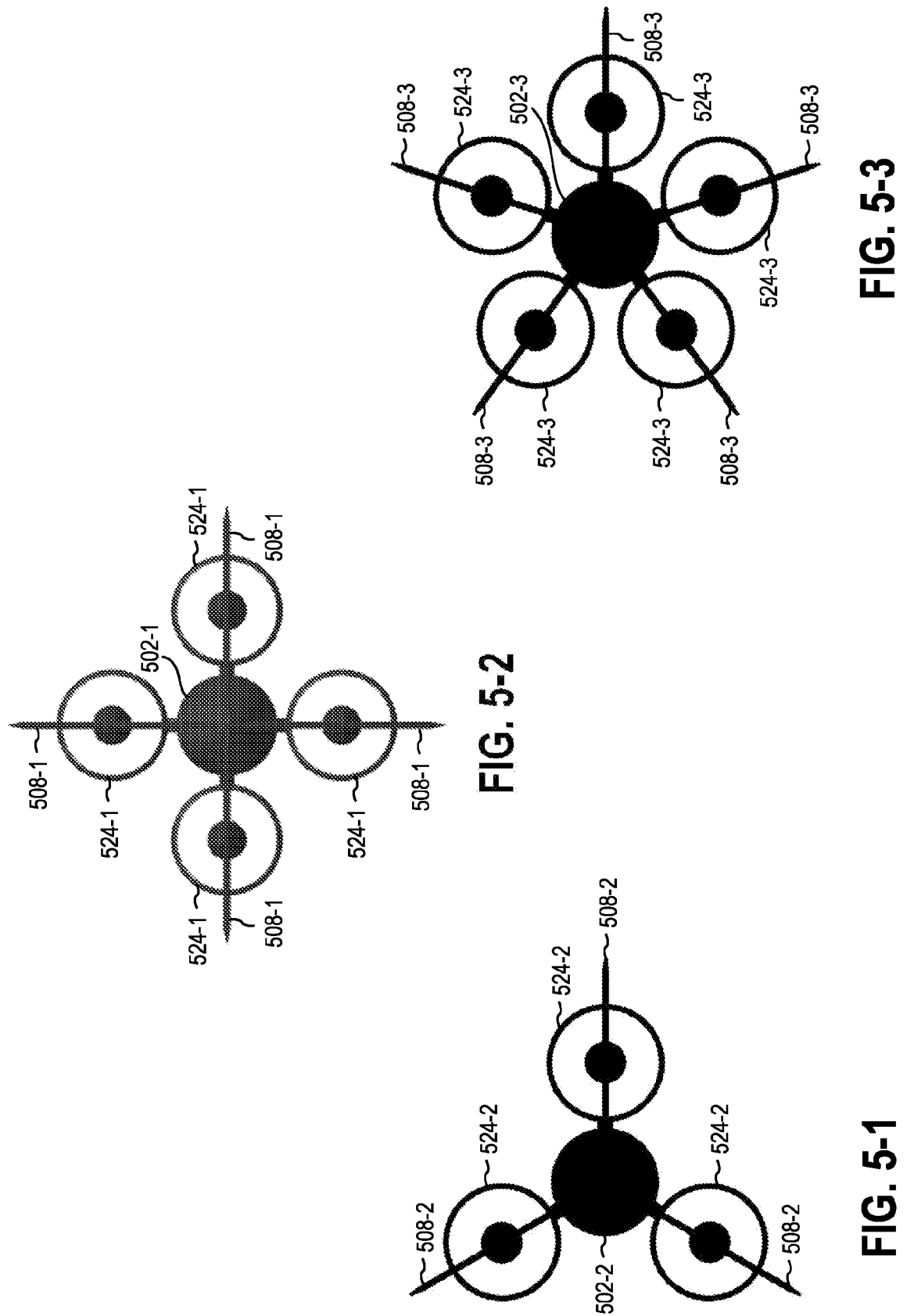

In some embodiments there may be three protective members 108. In FIG. 1, there are four protective members 108, but in some embodiments, there may be more or less than four protective members 108, as shown in FIGS. 5-2 and 5-3. The protective members 108 may be connected substantially near the nose tip 104 of the fuselage 102. For example, substantially near may be below but at close proximity of the nose tip, at the nose tip, or above the nose tip. In FIG. 1, the protective members 108 are connected below but at close proximity of the nose tip 104 and are free of any excrescences which could snag a transiting wire or cable. For example, in some embodiments, the below but at close proximity of the nose tip might be at the top 20% of the upper body of the aerial vehicle 112. In some embodiments, the below but at close proximity of the nose tip might be at the top 10% of the upper body of the aerial vehicle 112. In some embodiments, the below but at close proximity of the nose tip might be at the top 5% of the upper body of the aerial vehicle 112. In some embodiments, the below but at close proximity of the nose tip might be at the top 2% of the upper body of the aerial vehicle 112.

Figure 4:
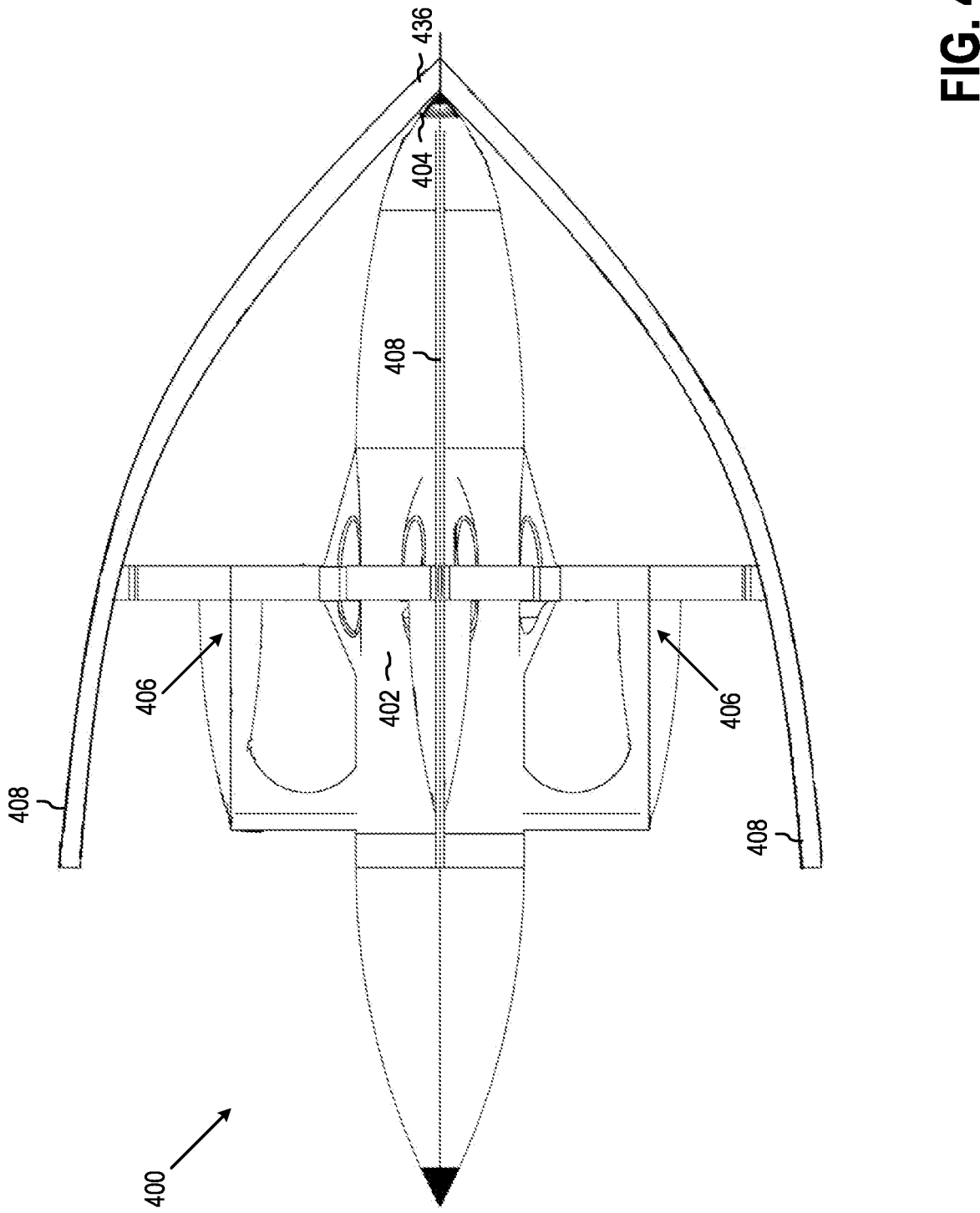
FIG. 4 represents an aerial vehicle in flight mode having third alternative type of nose tip, according to at least one embodiment.

In some embodiments, as shown in FIG. 3, the protective members 308 may be connected at the nose tip 304 which is at the forward end of the body X-axis. In some embodiments, as shown in FIG. 4, the protective members 408 may extend beyond the front of the fuselage (e.g., beyond the nose tip 404) and attach to other protective members 408, thereby forming a new nose tip 436. In this example, the protective members 408 form a second nose tip, such as a second nose tip 436.

In case of a wire strike, once the sharp nose tip 104, or the second nose tip 436 has pushed the wires over or under the aerial vehicle 100, the protective members 108 will further guide the wires lengthwise down the aerial vehicle 100 without allowing the wires to get caught on other components of the aerial vehicle, such as propellers, engines, lifting surfaces, control surfaces, antennas, or the fuselage. This way, the protective members 108 may protect the fuselage 102 and the payload from wire strikes. The protective members 108 also form a roll cage protecting the entire aircraft in the event of a roll-over in near-ground operations.

The upper body 112 of the aerial vehicle 100 may force the wires to either side of the aerial vehicle 100. In some situations, some wires may be pushed one side while at the same time other wires may be pushed on other side of the aerial vehicle 100. In some embodiments the upper body 112 is tangent ogive shaped. The tangent ogive shape may help prevent flight divergence by mitigating adverse pitch and yaw deviations experienced during a wire strike, as described in connection with FIG. 7.

The protective members 108 may prevent the pushed wires from being entangled with the propellers. In at least one embodiment described herein, the arch type shape of the protective members 108 will substantially reduce the pitching moment experienced by the aerial vehicle 100 once it has passed through the wires. This is due to the shape and length of the protective members 108. With a traditional aerial vehicle that don't include protective members, the pitching moment experienced by the aerial vehicle once it has passed through the wires is often so high that it will lead to flight path divergence. When a wire strikes a traditional aerial vehicle a huge amount of force will be imparted to a junction of the fuselage and wing, or fuselage and engine, or fuselage and other type of component. When there is no protective member to guide the wire to produce a favorable pitching balance, the force will tend to pitch the traditional aerial vehicle wildly up or down leading to divergence. The protective members 108 will reduce the pitching moment making it more gradual. Both the shape and the length of the protective members are critical in this. At the initial contact with the wire the resultant strike force tends to pitch the aerial vehicle down, but as the wire traverses along the protective member the resultant strike force will pitch the aerial vehicle back up. Hence, the protective members design creates favorable pitching balance for the aerial vehicle. This will allow the flight control to correct any divergent flight path caused by a wire strike. The wire strike scenario will be further discussed in connection with FIG. 7.

In some embodiments, the shape of the protective members 108 may be linear. In some embodiments, the shape of the protective members 108 may be curvilinear. The length of the protective members 108 is long enough to reach from substantially near the nose tip 104, extending laterally (e.g., radially) beyond the engines and propellers, and all other appendages. In some embodiments, an upper length of a protective member 108 may extend substantially 50% of the length above the center of gravity 110 of the aerial vehicle 100. In some embodiments, a lower length of a protective member 108 may extend substantially 50% of the fuselage length below the center of gravity 110 of the aerial vehicle 100. In some embodiments, the protective members 108 may act as empennage surfaces, horizontal or vertical stabilizers and/or canards. The chordwise width distribution may be consistent or varying with length along the body X-axis. The primary function of the forward section of the protective members 108 is to absorb the initial shock load during wire strike and distribute those loads without breaking to other structural members of the aircraft. As such the protective members 108 are designed to bear very high strike loads and may therefore act as primary load bearing members of the aircraft during normal flight operations independent of wire-strike events. The protective members 108 may also bear flight control surfaces like canardvaters, elevators, ailerons, rudders, ruddervators or flaperons. The protective members may also integrate continuously deformable flight control structures to actuate twist and/or camber changes for flight control.

In some embodiments, the protective members 108 have cross-sections that are aerodynamic and provide lift when the aerial vehicle 100 is in flight mode, complete with flight control surfaces as described above. When the aerial vehicle 100 is hovering, the lower part of the protective members 108 may act as an undercarriage with feet 114 that are used for takeoff and landing. These are further discussed in connection with FIG. 2.

In some embodiments, the protective members 108 may provide points for structural integrations of other systems. In some embodiments, the forwardmost structural integration of the protective members 108 occurs near the nose 104/436. Behind that point the protective members 108 and the forward power pods 218 intersect. This point, in at least one embodiment, provides a structural load path for accommodating powerplant and propulsor loads to the arch assembly as well as control and/or fuel lines. In some embodiments, the second attachment point of the protective members 108 is at the end of the rotor guards 224. The protective members may also accommodate navigation lights, antennae and/or radar elements in addition to low friction coefficient surface treatments so as to minimize friction during wire strike. Additionally, the protective members 108 also shield the aircraft from both lightning strike and electromagnetic pulses (EMP) as the aircraft may encounter electrical charges during a wire-strike event.

In some embodiments, the protective members 108 are formed of fiber-reinforced composites (FRC). FRCs are light weight and/or provide robustness and crashworthiness to the aerial vehicle. In some embodiments, the protective members are formed of aluminum. In some embodiments, the protective members are formed of carbon fiber. In some embodiments, the protective members are formed of metals like aluminum, steel, or titanium. In some embodiments, the protective members are formed of polycarbonate or other vacuformed plastics. In some embodiments, the protective members are formed of composite materials. For example, the composite materials may include fiber reinforced composites. Fiber reinforced composites may include metal matrix composites (MMCs), ceramic matrix composites (CMCs), carbon/carbon composites (C/C), and polymer matrix composites (PMCs) or polymeric composites. Examples of fiber reinforced composites may include KEV-LAR®-Balsa wood, fiberglass, fiber resins composites, other fiber reinforced composites, or combinations thereof. In some embodiments, the protective members are formed of combination of multiple materials.

Figure 6:
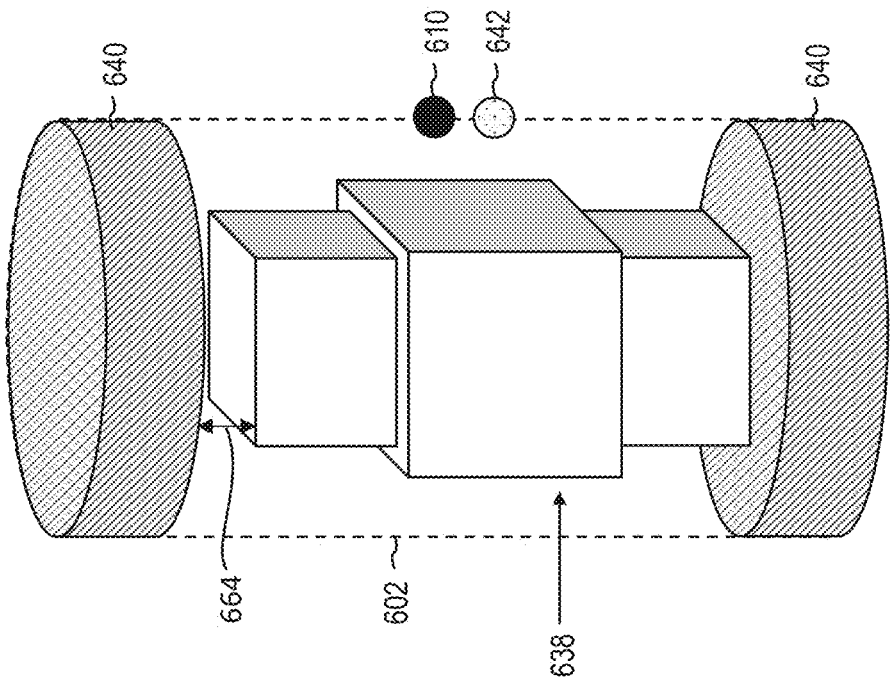
FIG. 6 is representation of a semi-transparent fuselage having a payload, according to at least one embodiment.

In some embodiments, the fuselage 102 serves as the main housing for a payload, such as the payload 638 in FIG. 6, and for avionics that enable the aerial vehicle 100 to fly autonomously. The aerial vehicle 100 may include a mechanism for moving the payload inside the elongate fuselage as further discussed in connection with FIG. 6. The purpose of allowing the payload to be moved up and down along the longitudinal axis inside the elongate fuselage 102 is to match the payload's center of gravity with the aerial vehicle's center of gravity 110. An aligned payload center of gravity may keep the overall center of gravity of the aerial vehicle as close as possible to an originally designed position while carrying variable payload weights. The benefit of aligning the payload's center of gravity to the aerial vehicles center of gravity 110 is that it allows for good stability and control of the aerial vehicle 100 in flight.

In some embodiments, the mechanism for moving the payload inside the elongate fuselage 102 includes one or more inflatable airbags, such as the inflatable airbags 640 in FIG. 6. In some embodiments, there may be one or more inflatable airbags both above and below the payload.

In some embodiments, the fuselage may include a payload door 116. In some embodiments, the payload door 116 is located substantially at the bottom part of the elongate fuselage 102. The benefit of this location is that the payload door 116 may be extended to lie on the ground surface as a tray, and the payload needs only to be placed on the tray to load the aerial vehicle 100. Once the door is lifted and the payload is inside the fuselage 102, the payload may be moved with the one or more inflatable airbags to a correct position. Once the aerial vehicle 100 reaches its destination and lands, the payload door 116 may automatically open revealing the payload inside. In some embodiments, the payload door 116 may be located substantially at the middle of the fuselage 102. The benefit of this location is that the payload may be placed substantially at the aerial vehicles center of gravity to begin with.

The elongate fuselage 102 may have substantially cylindrical shape with a tapered upper part 112. One benefit of using a tangent ogive shape for the nose 104 is that the flow separation is reduced along the surface of the fuselage 102, as laminar flow may be maintained for longer distances along the fuselage given specific Reynolds numbers of flight.

The aerial vehicle 100 may include plurality of engines 106. In some embodiments, the engines 106 are electrical motors. One benefit of using electrical motors, making an eVTOL (electrical vertical take-off and landing) aircraft, is that they are better suited for certain subscale mission profiles and the toy market.

In some embodiments, the aerial vehicle 100 may include fuel-based internal combustion motors. One benefit of using fuel-based motors is that they have higher system-level power-to-weight and power-to-volume ratios than electrical motors. This is important for certain high-performance variants of the aircraft requiring good hover performance, high dash speeds and endurance. For example, the aerial vehicle 100 may include Wankel based engines. A Wankel based engine is a type of internal combustion engine using an eccentric rotary design to convert pressure into rotating motion. This engine type is commonly referred to as a rotary engine. The benefit of using rotary Wankel engines is that they have fewer moving parts than a traditional fuel-based engine and they are dynamically balanced, which reduces risk of uncontrolled engine vibration in flight. Furthermore, the 4-cycle Rotary ROTAPOWER® engine series by Freedom Motors have an excellent power to weight ration and are particularly fuel efficient when compared to traditional engines.

The plurality of engines 106 includes plurality of propellers 122. In FIG. 1, each engine with propellers 122 is wrapped in a duct that acts as a ring wing 124. Ducted fans have at least two distinct advantages: the reduction of tip losses and the shielding (e.g., hindering contact with) of dangerous moving parts. Ducted fans can also be made safe around human operators such that no human body part may contact with a rotating component via tight protective meshing. Open rotors, conversely, are dangerous for ground operations and may injure operators and/or bystanders should they be struck by unshrouded rotors. Tip losses can be substantial in unshrouded rotors and reduce rotor efficiencies up to 20% by allowing for tip-relieving of loads at the ends of the rotors.

Furthermore, separating each engine 106 may allow for axial symmetry throughout the design. In some embodiments, three ring wings may be symmetrically separated around the fuselage (e.g., the longitudinal axis), as shown in FIG. 5-2. In some embodiments, there could be five ring wings symmetrically separated around the elongate fuselage, as shown in FIG. 5-3. In some embodiments, there could be more than five ducted fans symmetrically separated around the elongate fuselage. Each of the ring wings 124 is connected to the elongate fuselage 102 and/or to a protective member 108 by a connector member 120. While symmetry may be good to achieve for simplifying certain flight controllers, it is not necessary. In some embodiments, each ring wing may be arranged unsymmetrically around the fuselage body X-axis.

The ring wings, also known as rotor guards 124 may further include micro stators 148. These stators may act as a wire guard over the top of the propeller 122. One benefit of the micro stators is that they may hinder and/or prevent any human body part to come in contact with a rotating component. Another benefit of the micro stators is that they reduce the noise production of the propellers 122 by transmitting higher frequency noise, outside the human audio spectrum. In FIG. 1, the micro stators 148 are represented by the dashed lines on top of the propeller 122.

The individual ring wings 124 may have the advantage of excess inner volume that may be used for fuel storage (e.g., as a fuel tank 118). For example, one or more of ring wings 124 may contain a self-sealing bladdered fuel tank. One advantage of self-sealing bladdered fuel tank is that it keeps the fuel center of gravity consistent despite changes in either fuel volume or aerial vehicle 100 orientation. Another advantage of bladder fuel tanks is that they are necessary to prevent foamed fuel, which would be a problem for a convertible body-tilt aircraft due to fuel sloshing in a regular fuel tank. In FIG. 1, the fuel tank 118 is located between the ring wing 124 and an empennage 126. In some embodiments, as shown in FIG. 2, the fuel tank 218 may reach above the ring wing 224 and attach to the protective member 208 above the ring wing 224 and the empennage 226.

The aerial vehicle 100 may further include one or more fuel pumps attached to the fuel tank 118. The aerial vehicle 100 may further include a fuel transfer line. In some embodiments, the fuel transfer line may connect to one or more fuel tanks 118. In some embodiments, the plurality of engines 106 may be connected to a single fuel tank 118.

The plurality of engines 106 may be each connected to a single protective member 108. For example, the engines 106 may be connected to the protective members 108 via the ring wings 124. In some embodiments, if there are three engines, there will be three protective members. In embodiments where there are four engines, there may be four protective members. In embodiments where there are five engines, there may be five protective members. One benefit of placing the protective member on each engine is to hinder and/or prevent the propellers from causing damage to humans.

The aerial vehicle 100 may further include one or more empennage pieces 126 with or without flight control surfaces. The empennage 126 may function as a control method housing for the aerial vehicle. The empennage 126 may be positioned at the lower part of the elongate fuselage 128. For example, the empennage 126 may be positioned between the lower part of the fuselage 128 and the fuel tank 118. In some embodiments, the empennage 126 includes turning vane flaps 130. One advantage of including turning vane flaps 130 is that they may provide all the control needed to perform inflight operations or transitioning into and out of horizontal flight orientation, maneuvering around ground obstacles while in the vertical orientation, and steering towards the destination and around obstacles during cruise. The protective members 108 may also protect the flaps 130 from tail strikes.

In some embodiment, each turning flap 130 may be outfitted with two or more flight control servos. In some embodiments, there may be three flight control servos. One benefit of having three flight control servos is that two flight control servos can overpower and/or rip out a third malfunctioning servo.

The aerial vehicle 100 may further include landing ballute 132. For example, the landing ballute 132 may be an inflatable member forming the core of the ballute. The inflatable ballute 132 may be positioned to the lower part of the elongate fuselage 128. In some embodiments, the inflatable ballute 132 may consist of a KEVLAR® bag which may be inflated and/or deflated by the same exhaust line valve system that powers the payload positioning system. In some embodiments, when the aerial vehicle 100 has taken off, the ballute 132 may be inflated to full length, such as shown in FIG. 1. The full length of the ballute 132 may complete the fuselage 102 shape into another tangent ogive, similar to the nose tip 104 of the fuselage 102. One advantage of inflating the ballute 132 after takeoff is that it will drastically reduce flow separation during flight.

The inflatable ballute may extend further down than the protective members 108 when the ballute is in fully inflated configuration. When the aerial vehicle 100 is landing, the ballute may be the first point of contact for the aerial vehicle 100 and/or may act as a cushion, taking the landing load away from the protective members 108 and/or from the fuselage 102. This way, the heavy loads on the protective members 108 and/or their structural connections may be avoided, making the protective members 108 only needed to stabilize the aerial vehicle 100 during and/or after landing. In some embodiments, the protective members 108 may have structurally compliant ends (e.g., feet 114) that may further cushion any landing shocks on the aerial vehicle 100.

FIG. 2 is a representation of an aerial vehicle 200 following landing during ground operations with a fully deflated/retracted ballute, according to at least one embodiment. The aerial vehicle 200 includes an elongate fuselage

202 having a nose tip 204, plurality of engines 206 connected to the fuselage 202 and at least three protective members 208 connected substantially near the nose tip 204 of the fuselage 202 and longitudinally beyond the plurality of engines 206. The aerial vehicle 200 may further include a fuel tank 218 that is positioned inside the ring wing 224 and is connected to the protective member 208 and/or to an empennage 226. The ring wing 224 and/or the fuel tank 218 may be further connected to the fuselage 202 via a connector member 220. One benefit of having a fuel tank that extends both above and below of the ring wing is that it allows to store larger amount of fuel and hence can fly further and/or with heavier weight than the fuel tank 118 in FIG. 1.

When the aerial vehicle is landed, the landing ballute 232, such as the inflatable ballute 132 shown in fully inflatable configuration in FIG. 1, may be stored at the lower part of the fuselage 228. The protective members 208 may further include feet 214 that are used for stability when the aerial vehicle 200 is landing and/or when fully landed. The elongate fuselage 202 may have substantially rounded off bottom part 228. One benefit of the rounded off bottom part 228 is that the aerial vehicle 200 may sit evenly on the ground surface 234 or may extend to accommodate an uneven and/or tilted surface.

FIG. 3 is a representation of an aerial vehicle 300 in flight mode having second alternative type of nose tip 304, according to at least one embodiment. The aerial vehicle 300 includes an elongate fuselage 302 having a nose tip 304, a plurality of engines 306 connected to the fuselage 302, and at least three protective members 308 connected substantially near the nose tip 304 of the fuselage 302 longitudinally beyond the plurality of engines 306. In FIG. 3, the protective members are connected to the nose tip 304 and/or extend from the nose tip longitudinally beyond the plurality of engines 306. One benefit of having the protective members to connect to the nose tip is to prevent a depression in the design between the nose tip of the fuselage and the area where protective members attach to the fuselage, so that in wire strike situation the wire will run smoothly along the protective member without hitting any unintentional depression where the protective member connects to the fuselage.

FIG. 4 is a representation of an aerial vehicle 400 in fully converted horizontal flight mode having third alternative type of nose tip 404, according to at least one embodiment. The aerial vehicle 400 includes an elongate fuselage 402 having a nose tip 404, plurality of engines 406 connected to the fuselage 402, and at least three protective members 408 connected substantially near the nose tip 404 of the fuselage 402 longitudinally beyond the plurality of engines 406. In FIG. 4, the protective members 408 extend beyond the nose tip 404 and attach to each other longitudinally beyond the nose tip 404. Hence, the protective members 408 form a second nose tip 436 longitudinally beyond the fuselage nose tip 404. One benefit of having the protective members 408 connect longitudinally beyond the nose tip 404 to form a second nose tip 436 is to prevent the formation of a depression in the design between the nose tip of the fuselage and the area where protective members attach to the fuselage, so that in a wire strike situation the wire will run smoothly along the protective member without ever touching the fuselage, the engines, or other components.

FIG. 5-1 represents a top-down figure of an aerial vehicle 500-2 having three ring wings (rotor guards) 524-2, according to at least one embodiment. The aerial vehicle 500-2 includes an elongate fuselage 502-2, three ring wings 524-2 connected to the fuselage 502-2, and three protective members 508-2 connected to the fuselage 502-2 and/or the ring wings 524-2.

FIG. 5-2 represents a top-down figure of an aerial vehicle having four ring wings, according to at least one embodiment. The aerial vehicle 500-1 includes an elongate fuselage 502-1, four ring wings 524-1 connected to the fuselage 502-1 and four protective members 508-1 connected to the fuselage 502-1 and the ring wings 524-1.

FIG. 5-3 represents a top-down figure of an aerial vehicle having five ring wings, according to at least one embodiment. The aerial vehicle 500-3 includes an elongate fuselage 502-3, five ring wings 524-3 connected to the fuselage 502-3 and five protective members 508-3 connected to the fuselage 502-3 and the ring wings 524-3.

One benefit of symmetrically separating each ring wing 524-1, 524-2, 524-3 around the fuselage, as illustrated in FIG. 5-1, FIG. 5-2, and FIG. 5-3, is axially symmetric throughout the design. Axial symmetry provides better simplified and control of the aerial vehicle in flight mode, but it not necessary for flight as asymmetric arrangements also function well FIG. 6 is a representation of a semi-transparent fuselage having a payload. In some embodiments, the fuselage 602 serves as the main housing for a payload, such as the payload 638 in FIG. 6. In FIG. 6, there are three variable size rectangular packages and/or containers inside the fuselage 602. In some embodiments, there could be more or less than three packages/containers inside the fuselage. In some embodiments, the shape and/or size of the packages and/containers could be cylindrical, square, circular, any other shape and/or size, or combinations thereof.

One or more embodiments of an aerial vehicle described herein, such as the aerial vehicle 100 of FIG. 1, may include a mechanism for moving the payload 638 inside the elongate fuselage 602. In some embodiments, the mechanism for moving the payload 638 inside the elongate fuselage 602 includes one or more inflatable airbags 640. In FIG. 6, two inflatable airbags 640 are illustrated inside the fuselage 602, one above the payload 638 and one below the payload 638. In some embodiments, more than two inflatable airbags 640 may be included. For example, one of more inflatable airbags may be included on sides of the payload together with the top and bottom airbags. In some embodiments, more than one inflatable airbag may be included above and below the payload. For example, four inflatable airbags may be included below the payload and two inflatable airbags may be included above the payload.

One benefit of moving the payload 638 up and down inside the elongate fuselage 602 is to align the payload center of gravity 642 with the aerial vehicle's center of gravity, such as the center of gravity 110 in FIG. 1. This way the overall center of gravity of the aerial vehicle can be kept as close as possible to the design position with variable payload weights and shapes. One benefit of positioning the payload center of gravity near the aerial vehicles center of gravity is that it allows for good stability and control of the aerial vehicle in flight.

The two inflatable airbags 640 on FIG. 6 will work well for matching the payload center of gravity with the aerial vehicle's center of gravity on y-axis. In some embodiments, inflatable airbags on the sides of the fuselage will allow to match the payload center of gravity with the aerial vehicle's center of gravity in x-axis.

In FIG. 6, dot 610 represents the center of gravity of the aerial vehicle and dot 642 represents the payload center of gravity. Arrow 644 represents the free space located between the payload 638 and the inflatable airbag 640. By inflating the lower inflatable airbag 640 the payload 638 can be moved up, so that the payload center of gravity point 642 matches (e.g., is colinear with on the longitudinal axis) the aerial vehicle center of gravity 610. In some embodiments, the top inflatable airbag 640 can be inflated above to secure the payload 638 in place. In some embodiments, the inflatable airbag 640 at the bottom of the payload 638 may be partially inflated while the payload 638 is being loaded inside the fuselage 602 and the payload center of gravity 642 may be above the aerial vehicles center of gravity 610. The payload 638 may then be moved down by deflating the partially inflated airbag 640, so that the payload center of gravity 642 may match the aerial vehicles center of gravity 610.

Figure 7:
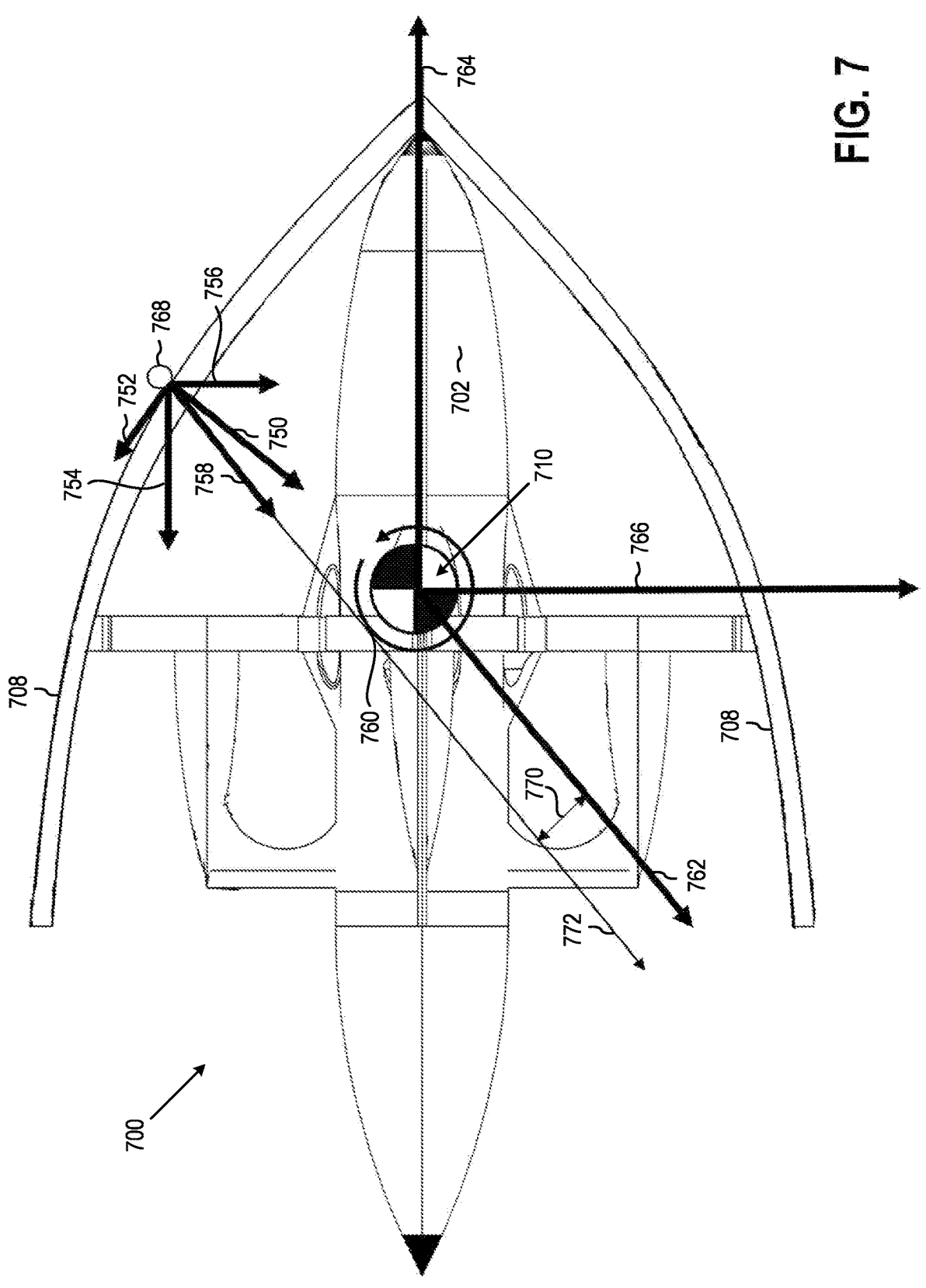
FIG. 7 represents the forces applied to an aerial vehicle during wire strike, according to at least one embodiment.

FIG. 7, illustrates forces applied to an aerial vehicle during a wire strike. The wire may strike the sharp nose tip of the aerial vehicle 700, then be diverted up or down and slide along the length of one or more protective members. As the wire slides along the length of a protective member 708, it imparts forces and moments along the length of the aerial vehicle 700. Two major components of the force include the normal force component 750, $F_{sN}$ (e.g., the force which is normal (or perpendicular) to the local protective member location) and the friction component 752, $F_{sf}$ (e.g., the tangential component of the force which is a function of the coefficient of friction experienced between the wire and the protective member). These two force vectors combine to form a Resultant Strike Force 758 which is a function of time, $F_s(t)$. If the Resultant Strike Force 758 is resolved into its two component vectors relative to the body x-axis 764 and body z-axis 766, then the forces result, $F_{sX}$ (e.g., the x-component of the strike force 754) and $F_{sZ}$ (e.g., the z-component of the strike force 756). By extending the vector of the resultant strike force 758 past the center of gravity 710 (shown as arrow 772), a pitching moment will be generated about the center of gravity, $M_{seg}(t)$ 760. During the strike event, sometimes this pitching moment is nose up, sometimes nose down. Generally, the pitching moment will start nose down given an overhead strike orientation. Then, as the cable traverses the length of the aerial vehicle 700 the moment will reverse and become nose up. At least one embodiment of a protective member geometry described herein will effectively minimize the integral of the forces and disturbance pitch angles as the aerial vehicle transits the striking cable. A protective member 708 having an arch shape will generally minimize the integral of forces and/or disturbance pitch angles.

In FIG. 7, the force vectors and moments are shown when the wire strike is on location 768. The resultant strike force offset distance is shown as 770. While FIG. 7 shows an ideal 2-dimensional strike event with the aerial vehicle 700 flying in a perfect+configuration, most strike events lead to the aircraft transiting wire strikes in the x configuration. This is the result of a stable rolling moment generated during the strike event about the body x-axis. The free body diagram shown in FIG. 7 certainly still applies, with a 45 deg roll rotation.

Figure 8:
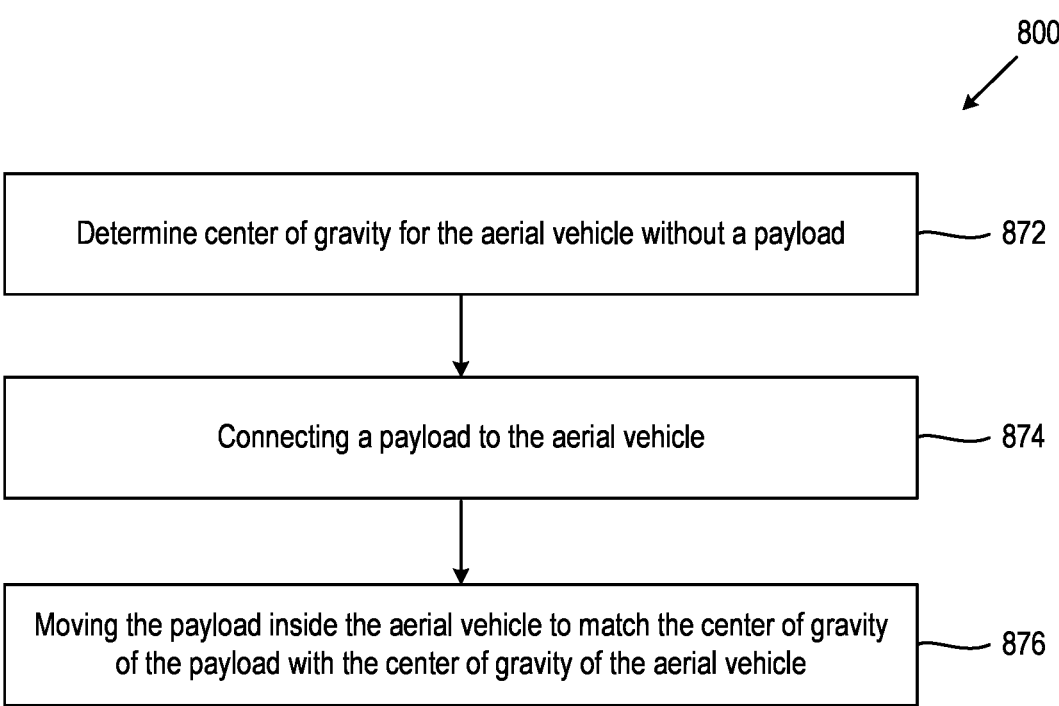
FIG. 8 is a flow chart illustrating a method for balancing an aerial vehicle, according to at least one embodiment.

FIG. 8 is a flow chart illustrating a method 800 for balancing an aerial vehicle, according to at least one embodiment. The center of gravity for the aerial vehicle without a payload is determined at 872. The aerial vehicle may be the aerial vehicle 100 in FIG. 1 or any other aerial vehicle described herein. A payload is inserted to the aerial vehicle at 874. The payload may be a payload 638 in FIG. 6 having a center of gravity, such as the payload center of gravity 642 in FIG. 6. The payload is moved inside the aerial vehicle to match the center of gravity of the payload with the center of gravity of the aerial vehicle at 876. The moving of the payload may be accomplished by one or more inflatable airbags, such as the inflatable airbag 640 in FIG. 6.

Figure 9:
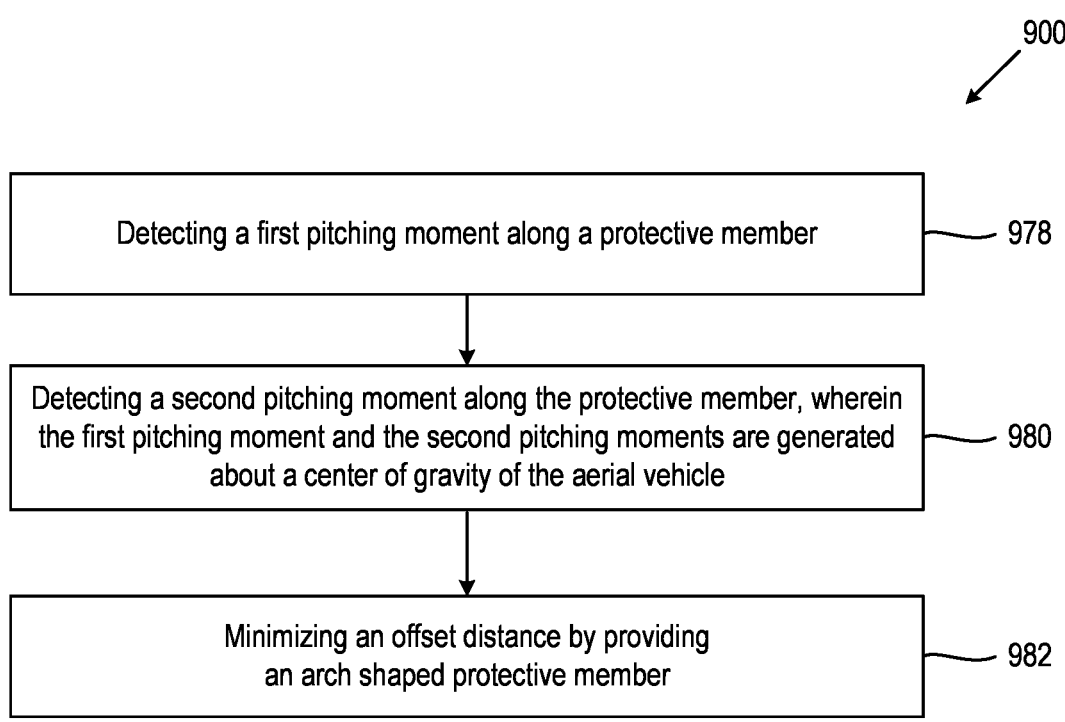
FIG. 9 is a flow chart illustrating a method for providing a low pitching moment for an aerial vehicle during wire strike, according to at least one embodiment.

FIG. 9 is a flow chart illustrating a method 900 for providing a low pitching moment for an aerial vehicle during wire strike, according to at least one embodiment. A first pitching moment along a protective member is detected at 978. A second pitching moment along a protective member is detected at 980. The first and the second pitching moments are generated about the center of gravity of the aerial vehicle. An offset distance is minimized by providing an arch shaped protective member at 982.

FIG. 10 is a flow chart illustrating a method 1000 for mitigating pitching, yawing, and rolling moments for an aerial vehicle during wire strike. Protective members provided such that their arched shape, internal structural arrangement, configuration, and surface treatments are designed to accommodate in-flight wire strike loads at 1084. Protective members are provided such that their shape and surface treatments mitigate applied forces as well as pitching, yawing and rolling moment disturbances to the aerial vehicle such that the aerial vehicle may achieve stable, controllable flight immediately following the wire-strike event at 1086. Protective members are provided such that no aerial vehicle structures or excrescences will cause the wire to snag or hang on the aerial vehicle during a wire-strike event at 1088.

Following are sections in accordance with embodiments of the present disclosure:

A1. An aerial vehicle, comprising:
a fuselage having a nose tip and being elongate;
a plurality of engines connected to the fuselage;
at least three protective members connected substantially near the nose tip of the fuselage longitudinally beyond the plurality of engines.

A2. The aerial vehicle of section A1, wherein the number of protective members is three.

A3. The aerial vehicle of any of sections A1 or A2, wherein the number of protective members is four.

A4. The aerial vehicle of any of sections A1-A3, wherein the at least three protective members are formed of at least one of fiber reinforced composites, aluminum, steel, titanium, fiberglass, and polycarbonate.

A5. The aerial vehicle of any of sections A1-A4, wherein the at least three protective members are connected below but at close proximity of the nose tip of the fuselage.

A6. The aerial vehicle of any of sections A1-A5, wherein the at least three protective members are connected to the nose tip of the fuselage.

A7. The aerial vehicle of any of sections A1-A6, wherein the at least three protective members are extending beyond the nose tip of the fuselage.

A8. The aerial vehicle of section A7, wherein the at least three protective members are attached to each other's on top of the nose tip of the fuselage.

A9. The aerial vehicle of Section A7, wherein the at least three protective members form a second nose tip.

A10. The aerial vehicle of any of sections A1-A9, wherein the at least three protective members are protecting the aerial vehicle from wire strike.

A11. The aerial vehicle of any of sections A1-A10, wherein the at least three protective members are protecting the plurality of engines from wire strike.

A12. The aerial vehicle of any of sections A1-A11, wherein the at least three protective members are shaped to prevent flight divergence upon a wire strike.

A13. The aerial vehicle of any of sections A1-A12, wherein the at least three protective members are shaped as an arch.

A14. The aerial vehicle of any of sections A1-A13, wherein the at least three protective members have a structurally compliant ends.

A15. The aerial vehicle of any of sections A1-A14, wherein the plurality of engines is each connected to a single protective member of the at least three protective members.

A16. The aerial vehicle of any of sections A1-A15, wherein the at least three protective members attach to the fuselage ahead of the center of gravity of the aerial vehicle.

A17 The aerial vehicle of any of sections A1-A16, wherein the elongate fuselage is configured to serve as a housing for a payload.

A18. The aerial vehicle of section A17, further including a mechanism for moving the payload inside the elongate fuselage.

A19. The aerial vehicle of section A18, wherein the mechanism for moving the payload includes one or more inflatable airbags.

A20. The aerial vehicle of section A19, wherein the one or more inflatable airbags are configured both above and below the payload.

A21. The aerial vehicle of sections A17-A20, wherein the elongate fuselage includes a payload door.

A22. The aerial vehicle of section A21, wherein the payload door is located substantially at a bottom part of the elongate fuselage.

A23. The aerial vehicle of any of sections A21 or A22, wherein the payload door is configured to open automatically upon landing.

A24. The aerial vehicle of any of sections A1-A23, wherein the elongate fuselage is configured to serve as a housing for avionics.

A25. The aerial vehicle of section A24, wherein the avionics are configured to enable the aerial vehicle to fly autonomously.

A26. The aerial vehicle of any of sections A1-A25, wherein the elongate fuselage has substantially cylindric shape.

A27. The aerial vehicle of any of sections A1-A26, wherein the elongate fuselage has substantially tangent ogive shaped upper part.

A28. The aerial vehicle of any of sections A1-A27, wherein the elongate fuselage has substantially rounded off bottom part.

A29. The aerial vehicle of any of sections A1-A28, wherein the plurality of engines includes electrical motors.

A30. The aerial vehicle of any of sections A1-A29, wherein the plurality of engines includes fuel-based motors.

A31. The aerial vehicle of any of sections A1-A30, wherein the plurality of engines includes internal combustion and/or Wankel based rotary engines.

A32. The aerial vehicle of any of sections A1-A31, wherein the plurality of engines includes plurality of propellers.

A33. The aerial vehicle of section A32, wherein the plurality of propellers is each protected by a duct.

A34. The aerial vehicle of section A33, wherein the ducted propellers act as a ring wing.

A35. The aerial vehicle of section A33 or A34, wherein the plurality of protective members are each connected to one duct.

A36. The aerial vehicle of any of sections A34 or A35, wherein the ring wing is connected to the elongate fuselage.

A37. The aerial vehicle of sections A34-A36, wherein the center of the ring wing contains a fuel tank.

A38. The aerial vehicle of section A37, wherein the fuel tank is a self-sealing bladdered fuel tank.

A39. The aerial vehicle of any of sections A37 or A38, wherein each fuel tank includes a fuel pump.

A40. The aerial vehicle of any of sections A37-A39, further including a fuel transfer line connecting each fuel tank.

A41. The aerial vehicle of any of sections A37-A40, wherein each of the plurality of engines is connected to the fuel tank.

A42. The aerial vehicle of any of sections A34-A41, further including micro stators.

A43. The aerial vehicle of section A42, wherein the micro stators are located over the top of the propeller.

A44. The aerial vehicle of any of sections A42 or A43, wherein the micro stators act as a wire guard over the propeller.

A45. The aerial vehicle of any of sections A42-A44, wherein the micro stator reduce noise production of the propellers by transmitting higher frequency noise.

A46. The aerial vehicle of any of sections A1-A45, further including empennage attached to the elongate fuselage.

A47. The aerial vehicle of section A46, wherein the empennage is positioned at the lower part of the elongate fuselage.

A48. The aerial vehicle of section A46, wherein the empennage is positioned between a lower part of the fuselage and a muffler volume end.

A49. The aerial vehicle of any of sections A46-A48, wherein the empennage includes turning vane flap.

A50. The aerial vehicle of any of sections A46-A49, wherein the empennage include at least one flight control servo.

A51. The aerial vehicle of any of sections A1-A50, further including a landing gear.

A52. The aerial vehicle of section A51, wherein the landing gear is an inflatable ballute.

A53. The aerial vehicle of section A52, wherein the inflatable ballute is positioned to a lower part of the elongate fuselage.

A54. The aerial vehicle of any of sections A52 or A53, wherein the inflatable ballute is a KEVLAR® bag.

A55. The aerial vehicle of any of sections A52-A54, wherein the inflatable ballute is inflated by an exhaust line valve.

A56. The aerial vehicle of section A55, wherein the inflatable ballute is deflated by the exhaust line valve.

A57. The aerial vehicle of any of sections A52-A56, wherein the inflatable ballute is inflated while the aerial vehicle is in air.

A58. The aerial vehicle of any of sections A52-A57, wherein the inflatable ballute has a substantially tangent ogive shape in inflated configuration.

A59. The aerial vehicle of any of sections A52-A58, wherein the inflatable ballute has symmetrical shape as a upper part of the elongate fuselage.

A60. The aerial vehicle of any of sections A52-A59, wherein the inflatable ballute extend further down than the at least three protective members when the inflatable ballute is in inflated configuration.

A61. The aerial vehicle of any of sections A52-A60, wherein the inflatable ballute is configured to touch ground first when the aerial vehicle is landing.

A62. The aerial vehicle of any of sections A52-A61, wherein the inflatable ballute is configured to deflate upon landing.

A63. The aerial vehicle of any of sections A1-A62, wherein the at least three protective members are configured to stabilize the aerial vehicle during and after landing.

A64. The aerial vehicle of any of sections A1-A63, wherein the protective members form a roll cage protecting the entire aircraft in the event of a roll-over in near-ground operations.

A65. The aerial vehicle of any of sections A1-A16, wherein the plurality of engines is each connected to a single protective member of the at least three protective members.

B1. A method for balancing an aerial vehicle, comprising:
determining center of gravity for the aerial vehicle without a payload;
inserting a payload to the aerial vehicle;
moving the payload, having a payload center of gravity, inside the aerial vehicle to match the center of gravity of the payload with the center of gravity of the aerial vehicle.

B2. The method of section B1, wherein the moving of the payload is done by one or more inflatable airbags.

B3. The method of any of sections B1 or B2, wherein both an upper part and a lower part of an elongate fuselage include one or more inflatable airbags.

B4. The method of section B3, wherein the upper part, the lower part, and side parts of an elongate fuselage include one or more inflatable airbags.

C1. A method for providing a low pitching moment for an aerial vehicle during wire strike, comprising:
detecting a first pitching moment along a protective member;
detecting a second pitching moment along the protective member, wherein the first and the second pitching moments are generated about the center of gravity of the aerial vehicle; and
minimizing an offset distance between one or more of the first pitching moment and the second pitching moment by providing an arch shaped protective member.

D1. A method for mitigating pitching, yawing, and rolling moments for an aerial vehicle during wire strike, comprising:
providing protective members such that their arched shape, internal structural arrangement, configuration, and surface treatments are designed to accommodate in-flight wire strike loads;
providing protective members such that their shape and surface treatments mitigate applied forces as well as pitching, yawing and rolling moment disturbances to the aerial vehicle such that the aerial vehicle may achieve stable, controllable flight immediately following the wire-strike event; and
providing protective members such that no aerial vehicle structures or excrescences will cause the wire to snag or hang on the aerial vehicle during a wire-strike event.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, or within 0.1%, of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, and within less than 0.1%, of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An aerial vehicle, comprising:
   a fuselage having a body and a nose, the nose including an upper body and a nose tip, the fuselage being elongate;
   a plurality of engines connected to the fuselage; and
   at least three protective members each connected to the fuselage at a first connection, and connected to the nose at a second connection longitudinally ahead of the plurality of engines at or proximate the nose tip of the nose.

2. The aerial vehicle of claim 1, wherein the at least three protective members are connected to the nose behind the nose tip in a direction of travel of the aerial vehicle, ahead of an aircraft center of gravity of the aerial vehicle.

3. The aerial vehicle of claim 1, wherein the at least three protective members are directly connected to the fuselage.

4. The aerial vehicle of claim 1, wherein the at least three protective members are connected to the nose and extend beyond the nose tip.

5. The aerial vehicle of claim 4, wherein the at least three protective members are attached to each other and extend beyond the nose tip.

6. The aerial vehicle of claim 1, wherein each protective member of the at least three protective members has a continuous arch shape from the second connection to an end of the protective member.

7. The aerial vehicle of claim 1, wherein the at least three protective members have structurally compliant ends.

8. The aerial vehicle of claim 1, wherein each protective member of the at least three protective members is connected a respective engine of the plurality of engines to form the first connection.

9. The aerial vehicle of claim 1, wherein the at least three protective members extend substantially a length of the aerial vehicle, attaching to the fuselage at one or more points ahead of an aircraft center of gravity of the aerial vehicle.

10. The aerial vehicle of claim 1, wherein the fuselage is configured to serve as a housing for a payload.

11. The aerial vehicle of claim 10, further including a mechanism for moving the payload inside the fuselage.

12. The aerial vehicle of claim 11, wherein the mechanism for moving the payload includes one or more inflatable airbags.

13. The aerial vehicle of claim 1, wherein the plurality of engines includes plurality of propellers and wherein the plurality of propellers is each protected by a duct.

14. The aerial vehicle of claim 13, further comprising a fuel tank positioned at a center of each of the propellers.

15. A method for mitigating pitching, yawing, and rolling moments for the aerial vehicle of claim 1 during a wire-strike event, comprising:
   providing protective members such that the protective members have an arched shape, internal structural arrangement, configuration, and surface treatments that are designed to accommodate in-flight wire strike loads;

providing protective members such that the arched shape and the surface treatments mitigate applied forces as well as pitching, yawing and rolling moment disturbances to the aerial vehicle such that the aerial vehicle is configured to achieve stable, controllable flight immediately following the wire-strike event; and providing protective members such that no aerial vehicle structures or excrescences will cause the wire to snag or hang on the aerial vehicle during the wire-strike event.

16. An aerial vehicle, comprising:

a fuselage having a body and a nose, the nose including an upper body and a nose tip, the fuselage being elongate;

a plurality of engines connected to the fuselage; and at least three protective members each connected to the fuselage at the nose at or proximate the nose tip of the nose, wherein the at least three protective members are curvilinear and extend from the nose of the fuselage in aft direction of aft direction of the aerial vehicle.

17. The aerial vehicle of claim 16, wherein the at least three protective members each connect to the nose at the nose tip to form the nose tip.

18. The aerial vehicle of claim 16, wherein the at least three protective members each connect to the nose longitudinally behind the nose tip in a direction of travel of the aerial vehicle, and wherein the at least three protective members connect to the nose behind the nose tip at a distance of at most 20% of the length of the nose.

19. The aerial vehicle of claim 18, wherein the at least three protective members each connect to the nose behind the nose tip at a distance of at most 2% of the length of the upper body.

20. The aerial vehicle of claim 16, wherein the at least three protective members each connect to the nose longitudinally in from of the nose tip in a direction of travel of the aerial vehicle.

* * * * *